(12) United States Patent
Chiba

(10) Patent No.: US 12,454,167 B2
(45) Date of Patent: Oct. 28, 2025

(54) LAMINATED GLASS

(71) Applicant: Nippon Sheet Glass Company, Limited, Tokyo (JP)

(72) Inventor: Kazuki Chiba, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 424 days.

(21) Appl. No.: 18/024,671

(22) PCT Filed: Sep. 3, 2021

(86) PCT No.: PCT/JP2021/032501
§ 371 (c)(1),
(2) Date: Mar. 3, 2023

(87) PCT Pub. No.: WO2022/050388
PCT Pub. Date: Mar. 10, 2022

(65) Prior Publication Data
US 2024/0025239 A1    Jan. 25, 2024

(30) Foreign Application Priority Data

Sep. 4, 2020    (JP) .................................. 2020-148606

(51) Int. Cl.
*B60J 1/00*    (2006.01)
*B32B 1/00*    (2006.01)
(Continued)

(52) U.S. Cl.
CPC .................... *B60J 1/02* (2013.01); *B32B 1/00* (2013.01); *B32B 17/10036* (2013.01);
(Continued)

(58) Field of Classification Search
CPC ........ B60J 1/02; B32B 1/00; B32B 17/10036; B32B 17/10293; B32B 17/10449;
(Continued)

(56) References Cited

U.S. PATENT DOCUMENTS 6,352,754 B1 *   3/2002   Frost ................. B32B 17/10036
                                                                52/173.3
6,765,177 B2 *   7/2004   Noguchi ................. C03C 17/36
                                                                219/203
(Continued)

FOREIGN PATENT DOCUMENTS

CN          107584833 A       1/2018
CN          107667080 A       2/2018
(Continued)

OTHER PUBLICATIONS

Chinese Office Action for Chinese Application No. 202180054551. 4, dated Jan. 17, 2025, with an English translation.
(Continued)

*Primary Examiner* — Steven O Douglas
(74) *Attorney, Agent, or Firm* — Birch, Stewart, Kolasch & Birch, LLP

(57) ABSTRACT

It is possible to prevent the appearance of laminated glass from deteriorating due to wrinkles formed in a functional layer of an intermediate film disposed between two curved glass plates. Laminated glass for an automobile is provided. Laminated glass according to the present invention includes an outer glass plate, an inner glass plate disposed opposite to the outer glass plate, and an intermediate film disposed between the outer glass plate and the inner glass plate. The outer glass plate and the inner glass plate are curved in a horizontal direction and a vertical direction. The intermediate film includes a functional layer, and a bonding layer for fixing the functional layer between the two glass plates. At least one notch or cut extending from the edge of the functional layer is formed in the functional layer.

13 Claims, 8 Drawing Sheets

(51) Int. Cl.
  *B32B 17/10* (2006.01)
  *B60J 1/02* (2006.01)
(52) U.S. Cl.
  CPC .. *B32B 17/10293* (2013.01); *B32B 17/10449* (2013.01); *B32B 17/10761* (2013.01); *B32B 2307/7376* (2023.05); *B32B 2605/00* (2013.01)
(58) Field of Classification Search
  CPC ...... B32B 17/10761; B32B 2307/7376; B32B 2605/00
  See application file for complete search history.

(56) References Cited

U.S. PATENT DOCUMENTS

| | | | |
|---|---|---|---|
| 11,964,544 B2* | 4/2024 | Chiba | B32B 17/10458 |
| 2015/0101736 A1 | 4/2015 | Izutani et al. | |
| 2016/0006112 A1* | 1/2016 | Kagaya | H01Q 9/16 343/712 |
| 2017/0050415 A1 | 2/2017 | Kanki et al. | |
| 2017/0341491 A1 | 11/2017 | Nakagawa | |
| 2018/0009294 A1 | 1/2018 | Yamakawa et al. | |
| 2018/0162104 A1 | 6/2018 | Chamberlain et al. | |
| 2019/0337270 A1* | 11/2019 | Sadakane | B32B 23/08 |
| 2021/0001695 A1 | 1/2021 | Ogawa et al. | |
| 2021/0059022 A1 | 2/2021 | Sadakane et al. | |
| 2022/0024282 A1 | 1/2022 | Chiba et al. | |
| 2023/0096675 A1* | 3/2023 | Chiba | B32B 17/10862 428/38 |

FOREIGN PATENT DOCUMENTS

| | | |
|---|---|---|
| CN | 111566067 A | 8/2020 |
| JP | 6-18856 A | 1/1994 |
| JP | 2012-197100 A | 10/2012 |
| JP | 2015-168599 A | 9/2015 |
| JP | 2016-64965 A | 4/2016 |
| JP | 2016-88493 A | 5/2016 |
| JP | 2018-524254 A | 8/2018 |
| WO | WO 2010/093023 A1 | 8/2010 |
| WO | WO 2019/230732 A1 | 12/2019 |
| WO | WO 2020/116586 A1 | 6/2020 |

OTHER PUBLICATIONS

Chinese Office Action and Search Report for Chinese Application No. 202180054551.4, dated Apr. 11, 2024, with an English translation.

Japanese Office Action for Japanese Application No. 2020-148606, dated Apr. 16, 2024, with an English translation.

International Search Report for PCT/JP2021/032501 (PCT/ISA/210) mailed on Nov. 2, 2021.

Written Opinion of the International Searching Authority for PCT/JP2021/032501 (PCT/ISA/237) mailed on Nov. 2, 2021.

Extended European Search Report for European Application No. 21864440.9, dated Sep. 12, 2024.

* cited by examiner

LAMINATED GLASS

TECHNICAL FIELD

The present invention relates to laminated glass to be used in an automobile or the like.

BACKGROUND ART

Laminated glass for an automobile to be used for a windshield or the like includes an outer glass plate, an inner glass plate, and an intermediate film disposed between these glass plates. In recent years, various functions have been added to the intermediate film. For example, a functional layer such as a heat-shielding film is disposed in the intermediate film in order to suppress an increase in temperature caused by light incident from the outside of a vehicle (Patent Literature 1, for example).

CITATION LIST

Patent Literature

Patent Literature 1: JP 2016-64965A

SUMMARY OF INVENTION

Technical Problem

Laminated glass as mentioned above is formed in a curved shape so as to be convex toward the vehicle exterior side. More specifically, for example, many windshields have a three-dimensional structure in which a windshield is curved along both an axis extending in the horizontal direction and an axis extending in the vertical direction. Accordingly, when a functional layer formed of a flat film is sandwiched between two glass plates, the functional layer is wrinkled, and thus the appearance deteriorates, which is problematic.

The present invention was achieved to solve the aforementioned problem, and it is an object thereof to provide laminated glass for an automobile capable of preventing the appearance from deteriorating due to wrinkles formed in a functional layer of an intermediate film disposed between two curved glass plates.

Solution to Problem

Aspect 1. Laminated glass to which an information acquisition device for acquiring information regarding the outside of a vehicle using light is attachable via a bracket, the laminated glass comprising:
an outer glass plate;
an inner glass plate disposed opposite to the outer glass plate;
a functional layer disposed between the outer glass plate and the inner glass plate;
a bonding layer for fixing the functional layer between the two glass plates; and
a shield layer that is provided on at least one of the outer glass plate and the inner glass plate and suppresses transmission of visible light from the outside of the vehicle,
wherein the outer glass plate and the inner glass plate are curved in a horizontal direction and a vertical direction,
the shield layer includes:
a peripheral edge region formed on a peripheral edge portion of the laminated glass to be fixed to a vehicle body; and
an attachment region that protrudes from the peripheral edge region and to which at least a portion of the bracket is to be attached, and
when a pair of virtual lines that extend perpendicular to an edge of the laminated glass from two sides of a connection portion where the attachment region and the peripheral edge region are coupled to each other are defined, at least one selected from at least one of notch and cut is formed at an edge of the functional layer at a position corresponding to one of a region located between the pair of virtual lines in the peripheral edge region, and the attachment region.

Aspect 2. The laminated glass according to aspect 1, wherein at least one notch is formed in the functional layer.

Aspect 3. The laminated glass according to aspect 2, wherein a tip portion of the notch is acute.

Aspect 4. The laminated glass according to any one of aspects 1 to 3,
wherein the outer glass plate and the inner glass plate are formed in a substantially rectangular shape with long sides and short sides, and
the notch or cut is formed near the long sides.

Aspect 5. The laminated glass according to any one of aspects 1 to 4,
wherein curvature radii in the horizontal direction and the vertical direction of each of the outer glass plate and the inner glass plate are different, and
the notch or cut is formed near an end side extending in the direction with a smaller curvature radius.

Aspect 6. The laminated glass according to any one of aspects 1 to 5,
wherein the attachment region is provided with an information acquisition region for accepting the light, and
the notch or cut is not formed in the information acquisition region.

Aspect 7. The laminated glass according to any one of aspects 1 to 5,
wherein the attachment region is provided with an information acquisition region for accepting the light, and
the notch is formed to include the information acquisition region.

Aspect 8. The laminated glass according to any one of aspects 1 to 7, wherein at least one second notch with an acute tip is formed on the edge where the notch or cut is formed, at a position different from that of the notch or cut.

Aspect 9. The laminated glass according to any one of aspects 1 to 8, wherein a plurality of the notches or cuts are formed.

Aspect 10. The laminated glass according to any one of aspects 1 to 9, wherein the notch or cut is further formed at a position corresponding to the peripheral edge region of the shield layer.

Aspect 11. The laminated glass according to any one of aspects 1 to 10, wherein the functional layer has a thickness of 2.0 mm or less.

Aspect 12. The laminated glass according to any one of aspects 1 to 11, wherein the functional layer is formed using a projection film for an HUD.

Aspect 13. The laminated glass according to any one of aspects 1 to 12, wherein the intermediate film includes the functional layer, and a pair of the bonding layers between which the functional layer is sandwiched.

Advantageous Effects of the Invention

With the present invention, it is possible to prevent the appearance from being deteriorated due to wrinkles formed in the functional layer of the intermediate film disposed between two curved glass plates.

DESCRIPTION OF EMBODIMENTS

Figure 1:
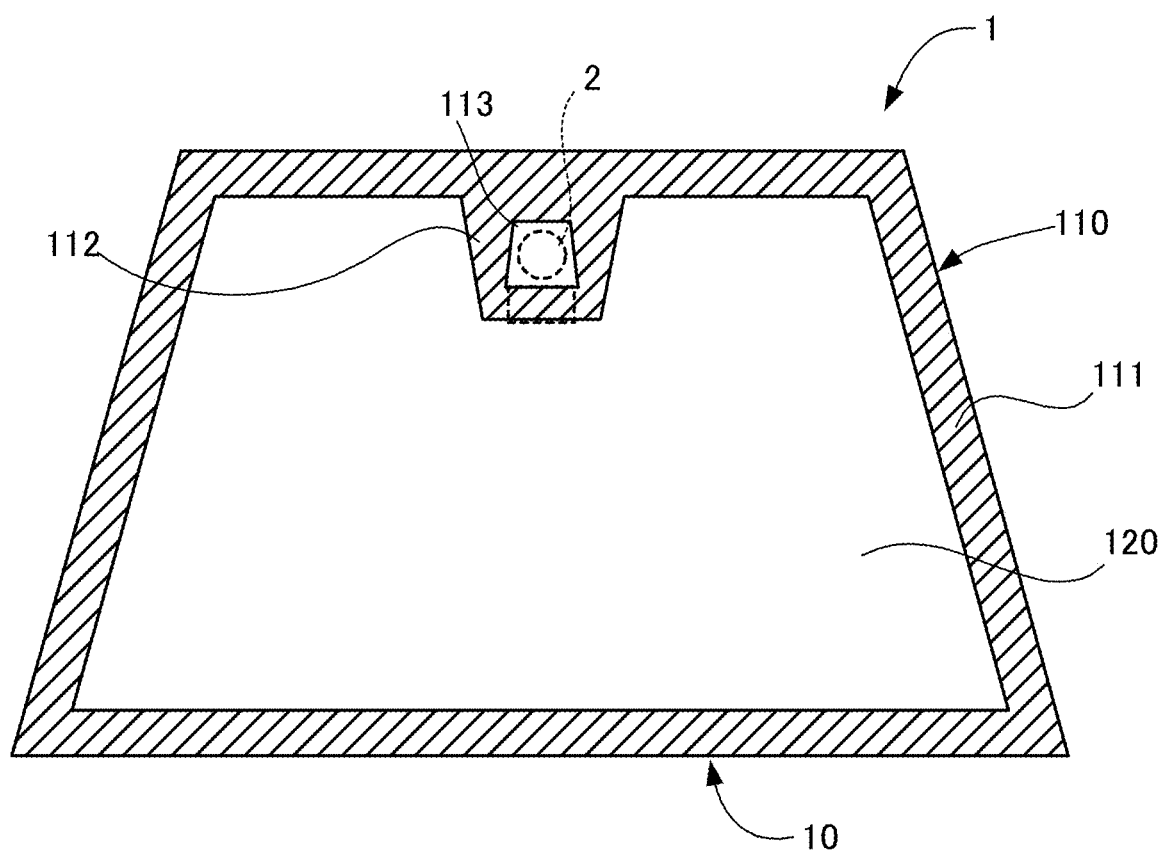
FIG. 1 is a plan view showing an embodiment in which laminated glass for an automobile according to the present invention is applied to a windshield.
Figure 2:
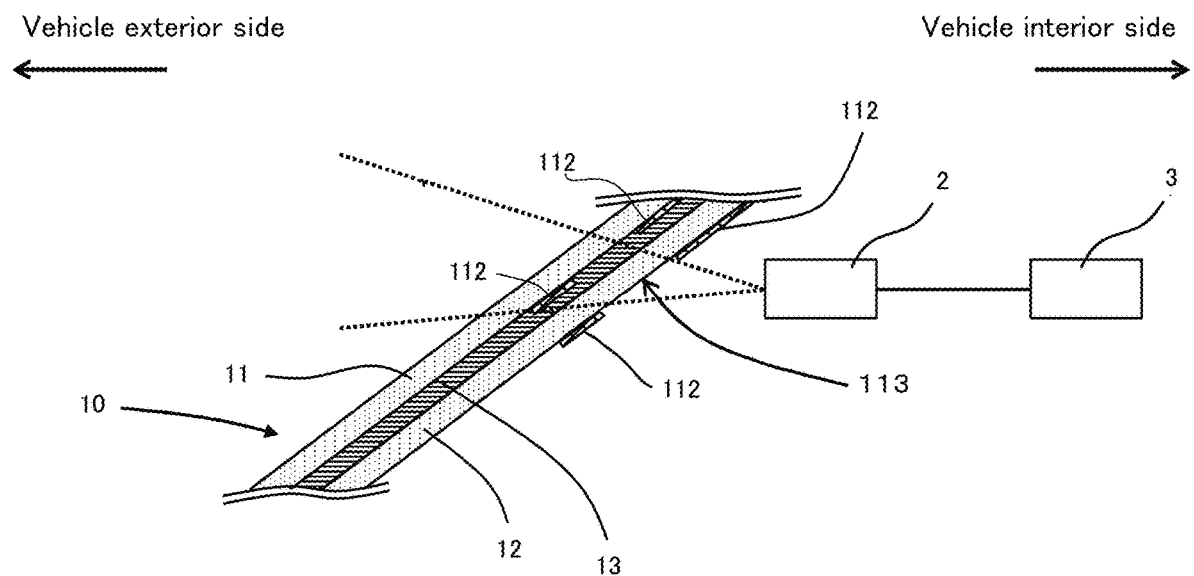
FIG. 2 is a cross-sectional view of FIG. 1.

First, the configuration of a windshield according to this embodiment will be described with reference to FIGS. 1 and 2. FIG. 1 is a plan view of the windshield, and FIG. 2 is a cross-sectional view of FIG. 1. Note that, for the convenience of description, the "up-down direction" in FIG. 1 is referred to as "upper and lower", "perpendicular", and "vertical", and the "left-right direction" in FIG. 1 is referred to as "horizontal". FIG. 1 illustrates the windshield as viewed from the vehicle interior side. That is to say, the far side of the sheet of FIG. 1 corresponds to the vehicle exterior side, and the near side of the sheet of FIG. 1 corresponds to the vehicle interior side.

As shown in FIGS. 1 and 2, this windshield includes substantially rectangular laminated glass 10, and is installed in a vehicle body in an inclined state. The laminated glass 10 includes an outer glass plate 11 disposed on the vehicle exterior side, an inner glass plate 12 disposed on the vehicle interior side, and an intermediate film 13 disposed between these glass plates 11 and 12. The peripheral edge portion of this laminated glass 10 is provided with a shield layer 110 that blocks the field of view from the outside of the vehicle, and an imaging device 2 is disposed such that the shield layer 110 conceals the imaging device 2 from the outside of the vehicle. However, the imaging device 2 is a camera for taking images of the outside of the vehicle. Thus, the shield layer 110 is provided with an imaging window (opening) 113 at a position corresponding to the imaging device 2, and the imaging device 2 disposed inside the vehicle can take images of the outside of the vehicle through the imaging window 113.

An image processing device 3 is connected to the imaging device 2, and the image processing device 3 processes images taken by the imaging device 2. The imaging device 2 and the image processing device 3 are included in an in-vehicle system 5, and the in-vehicle system 5 can provide various pieces of information to an occupant in accordance with processing performed by the image processing device 3. Hereinafter, these constituent elements will be described.

1. Laminated Glass 1-1. Glass Plate

First, the outer glass plate 11 and the inner glass plate 12 will be described. Known glass plates can be used as the outer glass plate 11 and the inner glass plate 12, and these glass plates can also be made of heat-ray absorbing glass, regular clear glass or green glass, or UV green glass. However, the glass plates 11 and 12 are required to have a visible light transmittance that conforms to the safety standards of the country in which the automobile is to be used. For example, adjustments can be made so that solar absorptance required by the outer glass plate 11 is ensured and the inner glass plate 12 provides a visible light transmittance that meets safety standards. An example of clear glass, an example of heat-ray absorbing glass, and an example of soda-lime based glass are shown below.

Clear Glass $SiO_2$: 70 to 73 mass %

$Al_2O_3$: 0.6 to 2.4 mass %

CaO: 7 to 12 mass %

MgO: 1.0 to 4.5 mass %

$R_2O$: 13 to 15 mass % (R represents an alkali metal)

Total iron oxide (T-$Fe_2O_3$) in terms of $Fe_2O_3$: 0.08 to 0.14 mass %

Heat-Ray Absorbing Glass

With regard to the composition of heat-ray absorbing glass, a composition obtained, based on the composition of clear glass, by setting the ratio of the total iron oxide (T-$Fe_2O_3$) in terms of $Fe_2O_3$ to 0.4 to 1.3 mass %, the ratio of $CeO_2$ to 0 to 2 mass %, and the ratio of $TiO_2$ to 0 to 0.5 mass %, and reducing the components (mainly $SiO_2$ and $Al_2O_3$) forming the framework of glass by an amount corresponding to increases in T-$Fe_2O_3$, $CeO_2$, and $TiO_2$ can be used, for example.

Soda-Lime Based Glass $SiO_2$: 65 to 80 mass %

$Al_2O_3$: 0 to 5 mass %

CaO: 5 to 15 mass %

MgO: 2 mass % or more

NaO: 10 to 18 mass %

$K_2O$: 0 to 5 mass %

MgO+CaO: 5 to 15 mass %

$Na_2O+K_2O$: 10 to 20 mass %

$SO_3$: 0.05 to 0.3 mass %

$B_2O$ 3: 0 to 5 mass %

Total iron oxide (T-$Fe_2O_3$) in terms of $Fe_2O_3$: 0.02 to mass %

Although there is no particular limitation on the thickness of the laminated glass 10 according to this embodiment, it is possible to set the total thickness of the outer glass plate 11 and the inner glass plate 12 to, for example, 2.1 to 6 mm, and the total thickness of the outer glass plate 11 and the inner glass plate 12 is preferably set to 2.4 to 3.8 mm, more preferably 2.6 to 3.4 mm, and particularly preferably 2.7 to 3.2 mm, from the viewpoint of weight reduction.

The outer glass plate 11 is mainly required to have durability and impact resistance against external hazards. When this laminated glass is used as, for example, a windshield of an automobile, impact resistance against flying objects such as small stones is required. On the other hand, a larger thickness leads to an increase in weight, and thus is not preferable. From this viewpoint, the thickness of the outer glass plate 11 is preferably 1.8 to 2.3 mm, and more preferably 1.9 to 2.1 mm. The thickness to be used can be determined in accordance with the application of the glass plate.

Although the thickness of the inner glass plate 12 can be made equal to that of the outer glass plate 11, the inner glass plate 12 can be made thinner than the outer glass plate 11 in order to, for example, reduce the weight of the laminated glass 10. Specifically, when the strength of the glass plate is taken into consideration, the thickness is preferably 0.6 to 2.0 mm, more preferably 0.8 to 1.6 mm, and particularly preferably 1.0 to 1.4 mm. Furthermore, the thickness is preferably 0.8 to 1.3 mm. With regard to the inner glass plate 12 as well, the thickness to be used can be determined in accordance with the application of the glass plate.

Moreover, this laminated glass 10 is curved so as to be convex toward the vehicle exterior side as describe later. In this case, the thickness is measured at two positions, namely an upper position and a lower position, on a center line (curved line OP, which will be described later) extending vertically at the center of the laminated glass 10 in the horizontal direction. Although there is no particular limitation on the measuring apparatus, a thickness gauge such as SM-112 manufactured by TECLOCK Corporation can be used, for example. During measurement, the laminated glass 10 is disposed such that the curved surface thereof is placed on a flat surface, and an end portion of the laminated glass 1 is sandwiched by and measured with the above-mentioned thickness gauge.

The outer glass plate 11 and the inner glass plate 12 are curved in the vertical direction and the horizontal direction so as to be convex toward the vehicle exterior side, and the vertical curvature radius and the horizontal curvature radius of each of the glass plates are different. The surface on the vehicle interior side of the outer glass plate 11 and the surface on the vehicle exterior side of the inner glass plate 12 are in contact with each other via the intermediate film 13, and therefore, these surfaces can be considered to have the same curvature radius. The vertical curvature radius of this portion is, for example, 1200 to 16000 mm, and the horizontal curvature radius thereof can be, for example, 400 to 6000 mm, which is smaller than the vertical curvature radius. Note that, although there is no particular limitation on a method for measuring a curvature radius, the curvature radius can be calculated based on a value obtained through three-dimensional measurement of the surface shape of each of the glass plates 11 and 12, or a measurement value obtained through measurement of the surface shape of each of the glass plates 11 and 12 using a depth gauge can be converted and used as a curvature radius.

1-2. Intermediate Film

Figure 3:
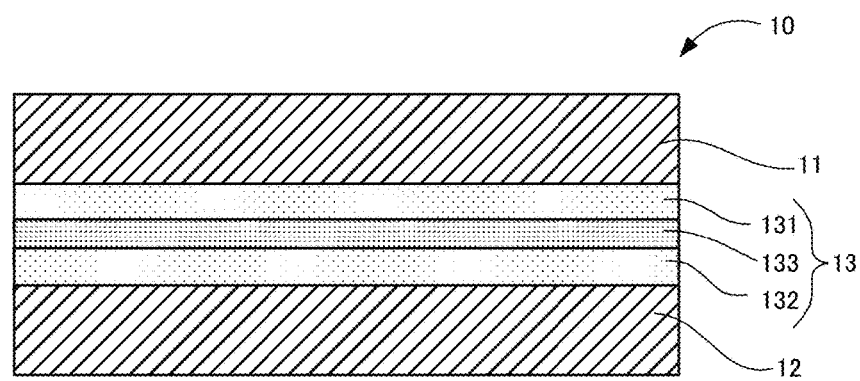
FIG. 3 is a cross-sectional view of a portion of the windshield shown in FIG. 1.

FIG. 3 is a cross-sectional view of a portion of the laminated glass. As shown in FIG. 3, the intermediate film 13 includes a transparent first bonding layer 131 bonded to the outer glass plate 11, a transparent second bonding layer 132 bonded to the inner glass plate 12, and a transparent functional layer 133 disposed between the two bonding layers 131 and 132.

There is no particular limitation on the first bonding layer 131 and the second bonding layer 132 as long as they are formed in a sheet-shape and are bonded to the glass plates 11 and 12 through welding. The first bonding layer 131 and the second bonding layer 132 can be made of, for example, a polyvinyl butyral resin (PVB) or ethylene vinyl acetate resin (EVA). In general, the hardness of a polyvinyl acetal resin can be controlled by adjusting (a) the degree of polymerization of polyvinyl alcohol, which is the starting material, (b) the degree of acetalization, (c) the type of plasticizer, (d) the ratio of the plasticizer to be added, and the like.

Before the first bonding layer 131 and the second bonding layer 132 are bonded to the glass plates 11 and 12, the surfaces of the first bonding layer 131 and the second bonding layer 132 may be embossed in order to be able to easily push out air while bonding the first bonding layer 131 and the second bonding layer 132 to the functional layer 133 or the glass plates 11 and 12.

Although there is no particular limitation on the thicknesses of the first bonding layer 131 and the second bonding layer 132, the thicknesses thereof are preferably to 2.0 mm, and more preferably 0.1 to 1.0 mm, for example. Note that the thicknesses of these bonding layers 131 and 132 may be the same or different.

The sum of the thicknesses of these bonding layers 131 and 132 is preferably 0.76 mm or more. This is intended to, for example, provide the windshield with penetration resistance and the like that conform to JIS R3211 and R3212.

Various functional films can be used as the functional layer 133 in accordance with the application. For example, a heat-shielding film, a heat-generating film, a projection film for an HUD, a light-emitting film, an antenna film, and the like can be used.

The heat-shielding film is a film configured to reflect or absorb infra-red rays in order to suppress an increase in temperature inside a vehicle.

The heat-generating film is used to remove fog or to melt ice, and a configuration can be employed in which a plurality of thin wires or a transparent conductive film that generates heat in response to the application of a voltage is supported by a base film.

The projection film is a film on which information is projected by irradiation with light emitted from a head-up display device (HUD device). Although there is no particular limitation on the projection film as long as, for example, it differs from the two bonding layers 131 and 132 in the refractive index and reflects light, a film that can control polarization and has a p-polarized light reflectivity higher than that of glass is preferable. Although there is no particular limitation on the size of the projection film, it is preferable that the projection film is larger than the area onto which information is to be projected.

The light-emitting film is a film in which an LED or the like is incorporated and from which light showing predetermined letters and figures is emitted.

The antenna film is a film in which antennas for FM, AM, DTV, DAB, and the like are disposed on a base film in the same manner as the heat-generating film.

These films are merely examples of the functional layer 133, and there is no limitation thereto.

Although there is no particular limitation on the thickness of the film included in the functional layer 133, the thickness thereof is preferably 0.01 to 2.0 mm, more preferably 0.02 to 1.0 mm, and even more preferably 0.03 to 0.6 mm, for example. As describe above, the upper limit of the thickness of the peripheral end portion of the film is preferably 2.0 mm. The reason for this is that, if an end portion of the film is thick, a step is formed in the intermediate film 13 due to the functional layer 133 being smaller than the two bonding layers 131 and 132, and when the intermediate film 13 is sandwiched between the two glass plates 11 and 12, air may be included due to this step, leading to the generation of bubbles.

It is preferable that the functional layer 133 has a small heat shrinkage ratio. For example, when heated at 130° C.

for 30 minutes, the functional layer preferably has a heat shrinkage ratio of 4% or less, more preferably 3% or less, and particularly preferably 2% or less. In particular, in the case where a projection film is used as the functional layer 133, the projection film preferably has a heat shrinkage ratio of 1% or less when heated at 130° C. for 30 minutes. The heat shrinkage ratio can be measured as follows. First, marks are placed on a film with the functional layer 133 at an interval of 500 mm, and then this film is placed on a substrate without being fixed thereto and is left to stand in an electric furnace kept at 130° C. for 30 minutes. The heat shrinkage ratio is calculated by measuring the length of the interval between the marks. Note that the horizontal heat shrinkage ratio and the vertical heat shrinkage ratio of the functional layer 133 may differ. For example, it is preferable that the horizontal heat shrinkage ratio is smaller than the vertical heat shrinkage ratio.

The thicknesses of the bonding layers 131 and 132 and the functional layer 133 can be measured, for example, as follows. First, a cross section (e.g., a cut surface) of the windshield is displayed enlarged by a factor of 175 using a microscope (e.g., VH-5500 manufactured by Keyence Corporation). Then, the thicknesses of the bonding layers 131 and 132 and the functional layer 133 are visually identified and measured. At this time, in order to eliminate variations seen in visual identification, the measurement is performed five times, and average values are taken as the thicknesses of the bonding layers 131 and 132 and the functional layer 133.

The sizes of the bonding layers 131 and 132 are the same as those of the outer glass plate 11 and the inner glass plate 12, whereas the functional layer 133 is smaller than the bonding layers 131 and 132. Specifically, the peripheral edge of the functional layer 133 is located inward from the peripheral edges of the glass plates 11 and 12. For example, it is preferable that the peripheral edge of the functional layer 133 is located 10 mm or more inward from the peripheral edges of the glass plates 11 and 12. One of the purposes of such a configuration is to prevent the entry of water from the edge portion of the intermediate film 13, which may occur when the edge portion of the functional layer 133 is wrinkled, as described later. Note that the position of the edge portion of the functional layer 133 can be adjusted such that the edge portion is concealed by a peripheral edge region 111 of the shield layer 110, which will be described later.

Figure 4:
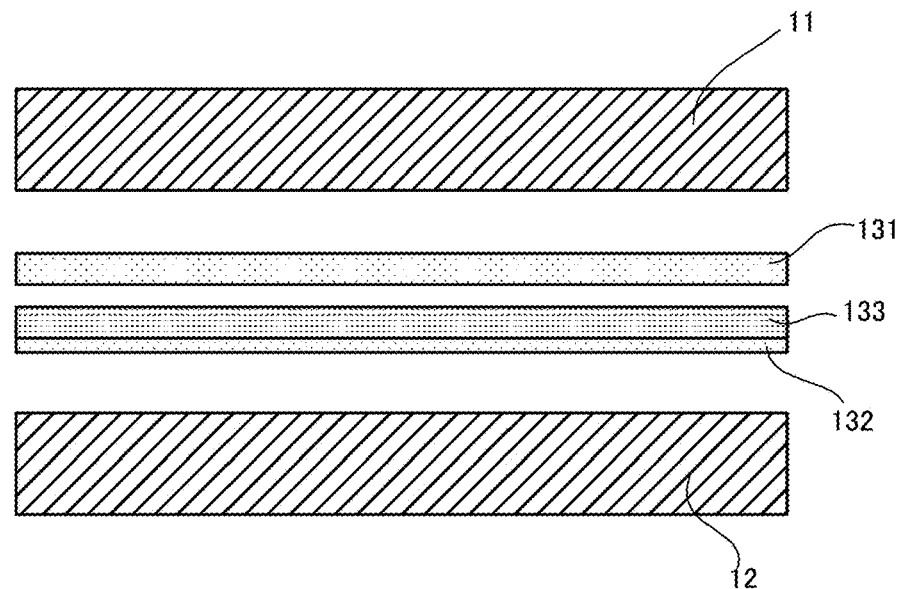
FIG. 4 is an exploded cross-sectional view of a portion of the windshield shown in FIG. 1.

For example, once the above-described bonding layers 131 and 132 and functional layer 133 have been separately prepared (3 layers in total) and then laminated, the resultant laminate can be disposed between the two glass plates 11 and 12 as described later. Alternatively, a bonding layer can be applied to one surface of the functional layer 133 in advance, for example. Specifically, as shown in FIG. 4, one functional layer 133 on which a bonding layer 132 is applied, and one first bonding layer 131 can be prepared. Alternatively, the bonding layers 131 and 132 can be bonded to two surfaces of the functional layer 133 in advance to prepare three layers in one piece. The thickness of the bonding layer 132 applied to the functional layer 133 can be reduced, for example, to 1 to 50 μm. In this case, the first bonding layer 131, which is thicker, can be disposed on the vehicle exterior side. The reason for this is that, in the case where a projection film is used as the functional layer 133, for example, the distance between the projection film 133 and a surface on the vehicle interior side of the inner glass plate 12 can be reduced, thus making it possible to shorten an optical path to reduce attenuation of light. Alternatively, a functional layer 133 in which bonding layers have been applied to the two surfaces can also be prepared. Note that it is also possible to dispose the first bonding layer 131, which is a thicker bonding layer, on the vehicle interior side and the second bonding layer 132 on the vehicle exterior side.

2. Shield Layer

Next, the shield layer 110 will be described. As illustrated in FIGS. 1 and 2, in this embodiment, the shield layers 110 are layered on a surface on the vehicle interior side of the outer glass plate 11 and a surface on the vehicle interior side of the inner glass plate 12. Specifically, as shown in FIG. 1, each of the shield layers 110 according to this embodiment includes a peripheral edge region 111 extending along the peripheral edge portion of the laminated glass 10, and a protruding region (attachment region) 112 that protrudes downward from near the upper side of the laminated glass 10, in a rectangular shape. The peripheral edge region 111 blocks light entering from the peripheral edge portion of the windshield. Meanwhile, the protruding region 112 conceals the imaging device 2 disposed inside the vehicle from the outside of the vehicle. Note that the shield layer 110 layered on the outer glass plate 11 and the shield layer 110 layered on the inner glass plate 12 can be formed in substantially the same shape, but need not necessarily have the same shape.

However, if the shield layer 110 blocks the imaging range of the imaging device 2, the imaging device 2 cannot take images of the situation forward of the vehicle exterior. Thus, in this embodiment, the protruding region 112 of the shield layer 110 is provided with a trapezoidal imaging window 113 at a position corresponding to the imaging device 2 such that the imaging device 2 can take images of the outside of the vehicle. That is to say, the imaging window 113 is provided independently of a non-blocking region 120 on the inner side in the in-plane direction with respect to the shield layer 110. Also, this imaging window 113 is a region where the material of the shield layer 110 is not layered, and thus it is possible to take images of the outside of the vehicle due to the laminated glass having the above-described visible light transmittance. Note that, although there is no particular limitation on the size of the imaging window 113, the size can be set to, for example, 7000 mm 2 or more. In the case where the camera of the imaging device 2 is a stereo camera or the imaging device 2 includes a plurality of cameras, a plurality of imaging windows 113 are provided.

The shield layer 110 may also be layered on only a surface on the vehicle interior side of the inner glass plate 12 or only a surface on the vehicle interior side of the outer glass plate 11, as described above.

Next, the material of the shield layer 110 will be described. The material of the shield layer 110 may be selected as appropriate according to embodiments as long as it can block the field of view from the outside of the vehicle, and a ceramic material with a dark color such as black, brown, gray, or dark blue may be used, for example. If a black ceramic material is selected as the material of the shield layer 110, for example, the black ceramic material is layered on the peripheral edge portion of an inner surface 130 of the inner glass plate 12 through screen printing or the like, and the layered ceramic materials are heated together with the inner glass plate 12. Thus, it is possible to form the shield layer 110 on the peripheral edge portion of the inner glass plate 12. Also, when a black ceramic material is printed, a region where the black ceramic material is not partially printed is provided. Accordingly, it is possible to form the imaging window 113. Note that various materials can be used as the ceramic material used for the shield layer 110. For example, it is possible to use a ceramic material with a composition shown in Table 1 below for the shield layer 110.

TABLE 1

|  |  | First and second colored ceramic paste |
|---|---|---|
| Pigment *1 | mass % | 10 |
| Resin (cellulose resin) | mass % | 10 |
| Organic solvent (pine oil) | mass % | 10 |
| Glass binder *2 | mass % | 70 |
| Viscosity | dPs | 150 |

*1 Main components: copper oxide, chromium oxide, iron oxide, and manganese oxide
*2: Main components: bismuth borosilicate and zinc borosilicate The shield layer 110 can be formed using the ceramic materials as mentioned above, or using polyurethane or the like, for example. Alternatively, a resin film can also be used, and the shield layer 110 can also be formed by attaching the resin films on the glass plates 11 and 12.

3. In-Vehicle System

Figure 5:
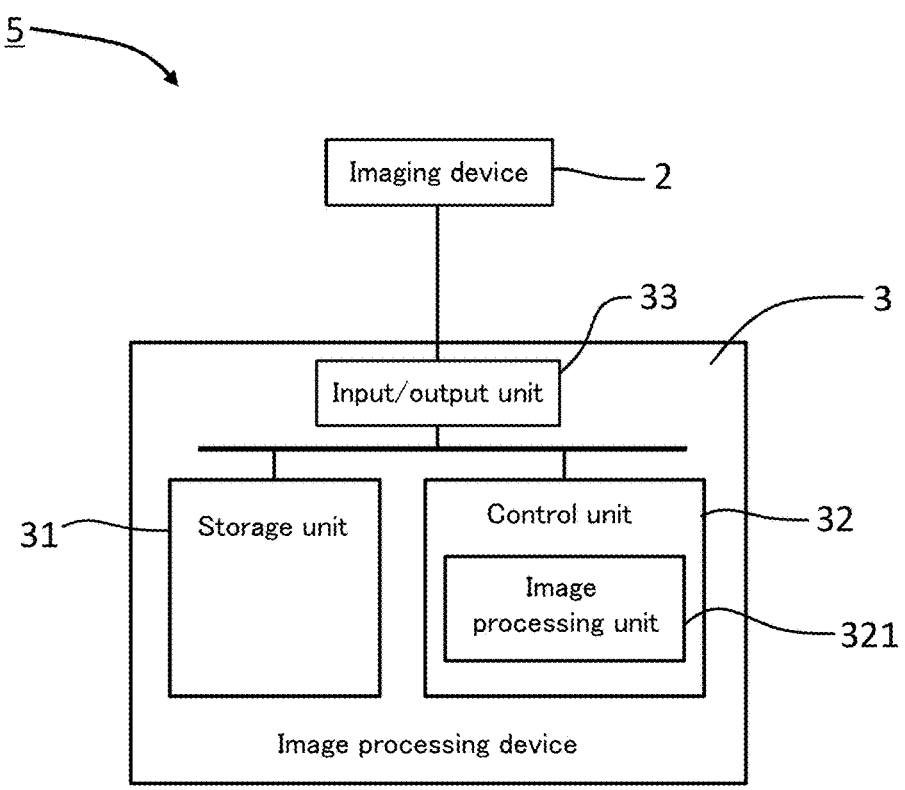
FIG. 5 is a block diagram showing an example of an image processing device.

Next, the in-vehicle system 5 that includes the imaging device (the information acquisition device) 2 and the image processing device 3 will be described with reference to FIG. 5. FIG. 5 illustrates the configuration of the in-vehicle system 5. As illustrated in FIG. 5, the in-vehicle system 5 according to this embodiment includes the above-mentioned imaging device 2 and the image processing device 3 connected to the imaging device 2.

The image processing device 3 is a device for processing images taken by the imaging device 2. This image processing device 3 includes, for example, general hardware such as a storage unit 31, a control unit 32, and an input/output unit 33 that are connected via a busbar, as pieces of hardware. However, the hardware configuration of the image processing device 3 is not limited to such an example, and, with regard to a specific hardware configuration of the image processing device 3, it is possible to add, or omit and add constituent elements as appropriate according to an embodiment.

The storage unit 31 stores various pieces of data and programs used in processing executed by the control unit 32 (not illustrated). The storage unit 31 may be realized by, for example, a hard disk, or a recording medium such as a USB memory. Also, various pieces of data and programs stored in the storage unit 31 may be acquired from a recording medium such as a CD (Compact Disc) or a DVD (Digital Versatile Disc). Furthermore, the storage unit 31 may be referred to as an "auxiliary storage apparatus".

As described above, the laminated glass 10 is disposed in an inclined orientation with respect to the vertical direction, and is curved. Also, the imaging device 2 takes images of the outside of a vehicle via such a laminated glass 10. Thus, the images taken by the imaging device 2 are deformed according to the orientation, shape, refractive index, optical defects, and the like of the laminated glass 10. Aberrations that are specific to the camera lens of the imaging device 2 also cause deformation. In view of this, the storage unit 31 may store correction data for correcting images that are deformed due to the laminated glass 10 and aberrations of the camera lens.

The control unit 32 includes one or more processors such as a microprocessor or a CPU (Central Processing Unit), and peripheral circuits (a ROM (Read Only Memory), a RAM (Random Access Memory), an interface circuit, and the like) used for processing performed by these processors. The ROM, the RAM, and the like may be referred to as the main storage apparatuses in the sense that they are located in the address space handled by the processors in the control unit 32. The control unit 32 functions as an image processing unit 321 by executing various pieces of data and programs stored in the storage unit 31.

The image processing unit 321 processes images taken by the imaging device 2. Processing performed on the captured images can be selected as appropriate according to an embodiment. For example, the image processing unit 321 may recognize a subject present in a captured image by analyzing the captured image through pattern matching or the like. In this embodiment, since the imaging device 2 takes images of the situation forward of the vehicle, the image processing unit 321 may further determine whether or not an organism such as a human being is in front of the vehicle based on this subject recognition. Then, if a person is in front of the vehicle, the image processing unit 321 may output a warning message, using a predetermined method. Also, the image processing unit 321 may perform a predetermined process on a captured image, for example. Then, the image processing unit 321 may output the processed captured image to a display device (not illustrated) such as a display connected to the image processing device 3.

The input/output unit 33 is one or more interfaces for transmitting and receiving data to/from a device that is present outside the image processing device 3. The input/output unit 33 is, for example, an interface for connecting to a user interface, or an interface such as a USB (Universal Serial Bus). Note that, in this embodiment, the image processing device 3 is connected to the imaging device 2 via the input/output unit 33, and acquires images taken by the imaging device 2.

In addition to a device designed exclusively for a provided service, a general-purpose device such as a PC (Personal Computer) or a tablet terminal may be used as such an image processing device 3.

Also, the above-mentioned imaging device 2 is attached to a bracket (not illustrated), and the bracket is attached within the protruding region 112 of the shield layer 110. Therefore, attachment of the imaging device 2 to the bracket and attachment of the bracket to the shield layer 110 are adjusted such that the optical axis of the camera of the imaging device 2 extends through the imaging window 113 in this state. Also, a cover (not illustrated) is attached to the bracket so as to cover the imaging device 2. Therefore, the imaging device 2 is disposed in the space surrounded by the laminated glass 10, the bracket, and the cover, and the imaging device 2 cannot be seen from the vehicle interior side, and only a portion of the imaging device 2 can be seen from the vehicle exterior side through the imaging window 113. Also, the imaging device 2 and the above-described input/output unit 33 are connected to each other by a cable (not illustrated), and this cable is drawn out from the cover and is connected to the image processing device 3 disposed at a predetermined position in the vehicle. Note that a portion to which the bracket is attached may span over the protruding region 112 and the peripheral edge region 111 adjacent to the protruding region 112 depending on the shape of the bracket.

4. Notch or Cut Formed in Intermediate Film

Notches or cuts are formed at the edge of the functional layer 133 of the intermediate film 13 according to the present invention. This is intended to suppress the formation of wrinkles in the functional layer 133 when the intermediate film 13 is sandwiched between the two glass plates 11 and 12 to manufacture the laminated glass 10. Note that, in the case where the functional layer 133 and the second bonding layer 132 are integrated as shown in FIG. 4, notches or cuts are also formed in the second bonding layer.

Figure 6:
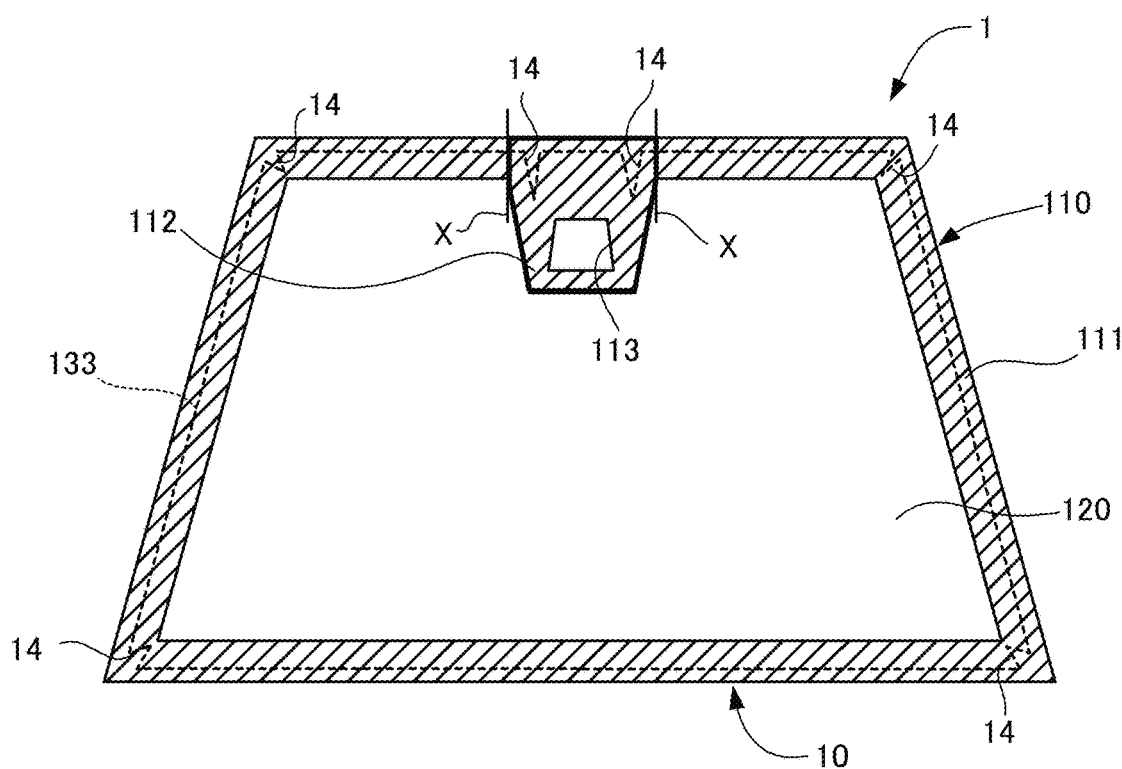
FIG. 6 is a plan view of the windshield shown in FIG. 1.

FIG. 6 shows an example of a notch. As described above, the edge portion of the functional layer 133 is disposed so as to be concealed by the shield layer 110, and notches 14 are also disposed so as to be concealed by the shield layer 110. Specifically, the notches 14 are formed as follows. First, a pair of virtual lines X that extend perpendicular to the edge of the laminated glass from two sides of the protruding region 112 in a connection portion where the protruding region 112 and the peripheral edge region 111 are coupled to each other are defined. Then, a combination of the protruding region and a region located between the pair of virtual lines in the peripheral edge region is defined as a notch region (the region surrounded by a bold line in FIG. 6). In this embodiment, first, two notches 14 are formed above the imaging window 113 in this notch region with a predetermined distance therebetween. In addition, notches 14 are formed at four corner portions of the functional layer 133. Although all of the notches 14 are formed in a triangular shape having a corner portion with a sharp tip, there is no particular limitation on the shape of the notches 14.

Figure 7A:
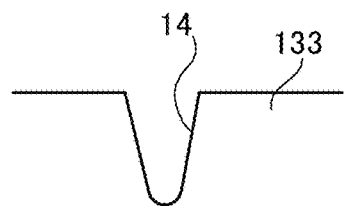
FIG. 7A is a diagram showing an example of a notch.
Figure 7B:
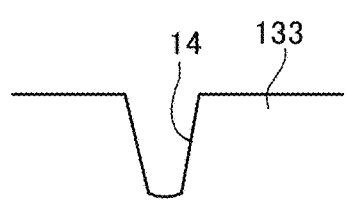
FIG. 7B is a diagram showing an example of a notch.
Figure 7C:
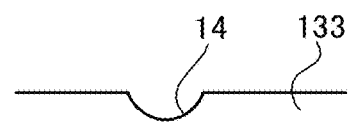
FIG. 7C is a diagram showing an example of a notch.
Figure 7D:
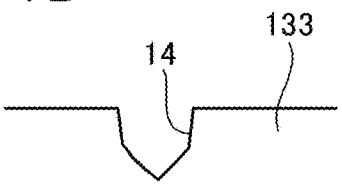
FIG. 7D is a diagram showing an example of a notch.

For example, a notch 14 shown in FIG. 7A is formed in a triangular shape whose width decreases toward the tip, but the tip has an arc shape. A notch 14 shown in FIG. 7B is formed in a trapezoidal shape whose width decreases toward the tip. A notch 14 shown in FIG. 7C is formed in an arc shape. In addition, a notch 14 shown in FIG. 7D is formed in a polygonal shape. Note that these are merely examples of the notch 14, and the notch 14 can be formed in various shapes as long as it has a predetermined area.

Figure 8:
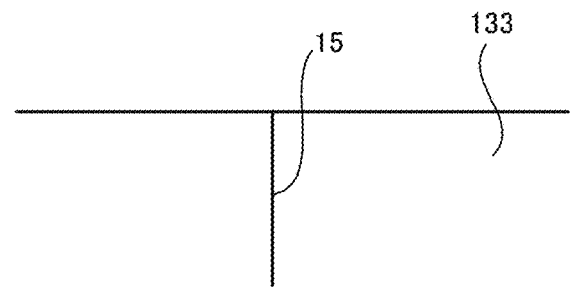
FIG. 8 is a diagram showing an example of a cut.

A cut 15 may also be formed as shown in FIG. 8, instead of the notch 14 having an area. Although the cut 15 is formed in a linear shape, its shape may be a linear shape as shown in FIG. 8, or a curved shape, or a combination of a plurality of straight lines or curved lines.

Furthermore, the number and positions of the notches 14 or cuts 15 are not particularly limited, and can be set as appropriate. For example, six notches 14 are formed in the example shown in FIG. 6, but this is merely an example, and it is sufficient that one or more notches are formed at the edge of the functional layer 133. However, it is preferable that a notch 14 or cut 15 is formed in at least the notch region. Alternatively, unlike the example shown in FIG. 6, a notch 14 or cut 15 can also be formed at a position on any of the upper side, the lower side, the right side, and the left side of the functional layer 133 other than the corner portions thereof. Furthermore, both a notch 14 and a cut 15 may also be formed. Note that a notch formed on the upper side of the functional layer 133 outside the notch region corresponds to a second notch according to the present invention.

In the case where the functional layer 133 to which the bonding layer 132 is applied as shown in FIG. 4 is used, a notch 14 or cut 15 can be formed in the functional layer 133 and the bonding layer 132. In this case, a notch 14 or cut 15 is not formed in the first bonding layer 131.

5. Method for Manufacturing Windshield

Next, an example of a method for manufacturing a windshield configured as described above will be described. First, a method for manufacturing the laminated glass 1 will be described.

First, the above-described shield layer 110 is layered on at least one of the plate-shaped outer glass plate 11 and inner glass plate 12. Next, these glass plates 11 and 12 are shaped to be curved. There is no particular limitation on the shaping method, and a known method can be employed. For example, the glass plates can be shaped into a curved shape by pressing the glass plates using an upper mold and a lower mold after passing them through a heating furnace. Alternatively, the plate-shaped outer glass plate and inner glass plate are stacked and placed on a frame-shaped mold, and are then passed through a heating furnace. Thus, the two glass plates are softened, and are shaped into a curved shape under their own weight.

After the outer glass plate 11 and the inner glass plate 12 have been shaped into a curved shape in this manner, a laminate in which the intermediate film 13 is sandwiched between the outer glass plate 11 and the inner glass plate 12 is formed and then placed into a rubber bag, and preliminarily bonding is carried out at about 70 to 110° C. under vacuum suction. As described above, the intermediate film 13 is formed by layering the bonding layers 131 and 132 and the functional layer 133. Preliminary bonding can be carried out using a method other than this method. For example, a laminate in which the intermediate film 13 is sandwiched between the outer glass plate 11 and the inner glass plate 12 is formed and then heated in an oven at 45 to 65° C. Subsequently, this laminated glass is pressed using a roll at 0.45 to 0.55 MPa. Then, the laminated glass is heated in an oven again at 80 to 105° C., and is then pressed again using a roll at 0.45 to MPa. Preliminary bonding is completed in this manner.

Then, permanent bonding is performed. The preliminarily bonded laminated glass is permanently bonded using an autoclave, for example, at a pressure of 8 to 15 atm and at 100 to 150° C. Specifically, permanent bonding can be performed, for example, under the conditions of 14 atm of pressure and a temperature of 140° C. Thus, the laminated glass 10 according to this embodiment is manufactured. Note that, in the case where the functional layer 133 to which the bonding layer 132 is applied is used, the notch 14 or cut 15 is formed in this bonding layer 132, but the notch 14 formed in the bonding layer 132 is covered by the first bonding layer 131 because both the bonding layers 131 and 132 are melted through heating. Accordingly, both the glass plates 11 and 12 are fixed via the bonding layers 131 and 132.

6. Features

With the windshield as described above, the notch 14 or cut 15 is formed in the flat functional layer 133 to be disposed between the two curved glass plates 11 and 12, so as to be located in the above-described notch region. When the inventors removed the shield layer 110 and observed the functional layer 133, it was found that a wrinkle extended from the notch 14 or cut 15. Also, it was found that this wrinkle and the notch 14 or cut 15 extended in substantially the same direction. Accordingly, even if a wrinkle is formed, this wrinkle is formed in the notch region of the shield layer 110, thus making it possible to conceal the wrinkle from the outside. That is to say, the wrinkle can be concealed in the notch region together with the notch 14 or cut 15 by forming the notch 14 or cut 15, which may cause the formation of a wrinkle, in the notch region. Thus, it is possible to prevent the appearance of the windshield from deteriorating.

As long as the notch 14 or cut 15 is located in the peripheral edge region 111, it is acceptable that only a small portion of the notch 14 or cut 15 is located outside the notch region. However, in order to prevent a wrinkle from being partially located outside the notch region as much as possible, the notch 14 or cut 15 is preferably 10 mm or more away from the virtual line X, and more preferably 20 mm or more away from the virtual line X (see FIG. 11, for example). Also, a distance from the tip of the notch 14 or cut 15 to the imaging window 113 in the vertical direction is preferably 20 mm or more, for example, more preferably 30 mm or more, and particularly preferably mm or more.

Moreover, the inventors found that, as described above, it is possible to suppress the formation of wrinkles by forming cuts 14 or notches 15 at the corner portions and the like in addition to a cut region in the functional layer 133.

The inventors also found that the notch 14 or cut 15 may not cause the formation of a wrinkle. That is to say, when the flat functional layer 133 is disposed between the two curved glass plates 11 and 12, deformation of the edge portion of the functional layer 133 is absorbed by the notch 14 or cut 15, and therefore, no wrinkles are formed in some cases.

7. Variations

Although an embodiment of the present invention has been described above, the present invention is not limited to the embodiment above, and various modifications can be carried out without departing from the gist of the invention. Note that the following variations can be combined as appropriate.

7-1

There is no particular limitation on the shape of the shield layer 110. Although the shield layer 110 includes the peripheral edge region 111 and the protruding region 112 in the above-described embodiment, the shape and position of the protruding region 112 and the shape and number of the imaging window 113 can be changed as appropriate, for example, and the width of the peripheral edge region 111 need not be constant and may vary. Also, it is sufficient that the shield layer 110 is formed on one of the outer glass plate 11 and the inner glass plate 12 as mentioned above. In this case, if wrinkles are formed in the functional layer 133, it is sufficient that wrinkles are concealed by either the shield layer 110 of the glass plate 11 or the shield layer 110 of the glass plate 12.

7-2

Although the functional layer 133 is sandwiched between the two bonding layers 131 and 132 in the embodiment above, an intermediate layer 13 formed by layering one bonding layer and one functional layer 133 may also be employed. In this case, the functional layer 133 needs to contain a material that can be bonded to the glass plates 11 and 12, and may contain, for example, PVB, PVA, EVA, or the like.

7-3

Figure 9:
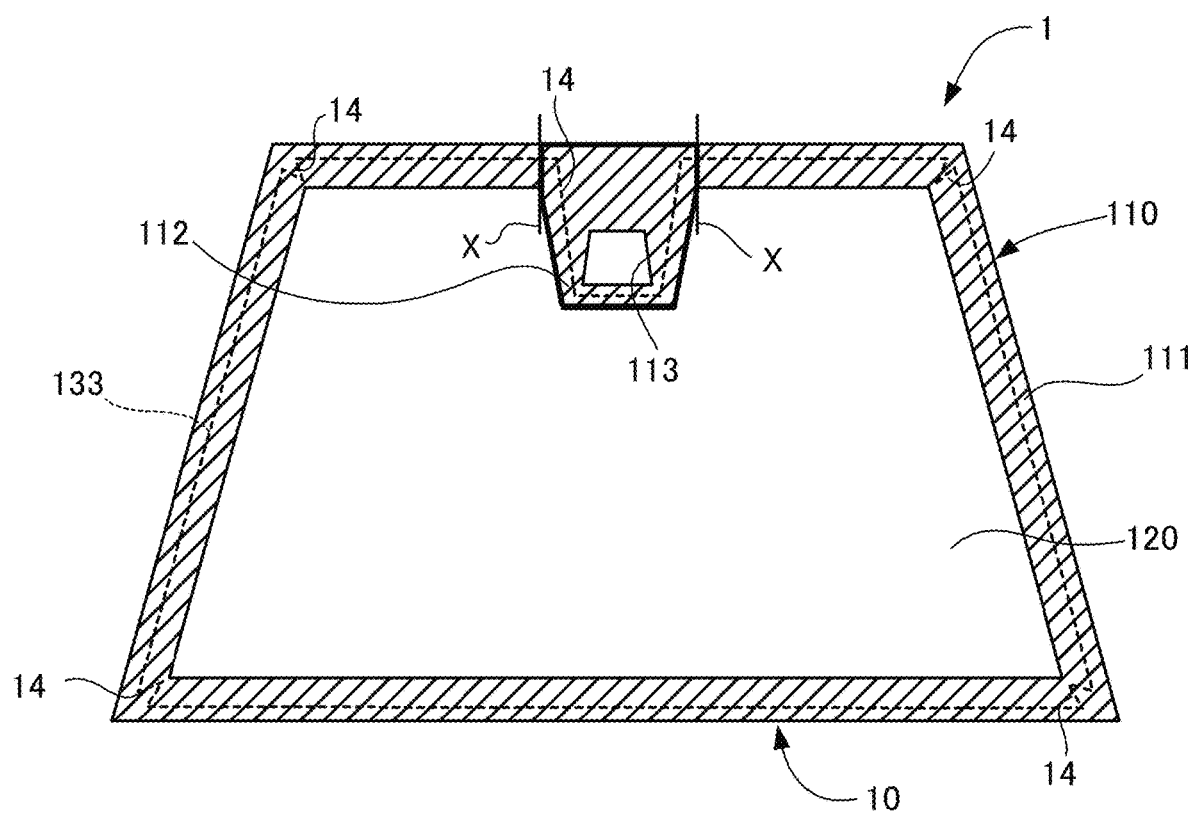
FIG. 9 is a diagram showing another example of a cut.

The notch can be formed in a shape shown in FIG. 9. The example shown in FIG. 9 is configured such that a notch 14 is formed in a rectangular shape extending downward from the edge of the functional layer 133, and the imaging window (information acquisition region) 113 formed in the shield layer 110 is included in this notch 14. Thus, it is possible to further suppress the formation of wrinkles in the functional layer 133 inside the imaging window 113. Note that the notch may have a shape other than a rectangular shape, and there is no particular limitation on the shape of the notch as long as the imaging window is included in the notch.

7-4

Although an example in which the laminated glass for an automobile according to the present invention is applied to a windshield is shown in the embodiment above, the laminated glass can also be applied to a rear window, a side window, and the like. In this case, the shield layer 110 need not be necessarily provided.

EXAMPLES

Hereinafter, examples of the present invention will be described. However, the present invention is not limited to the following embodiments.

Figure 10:
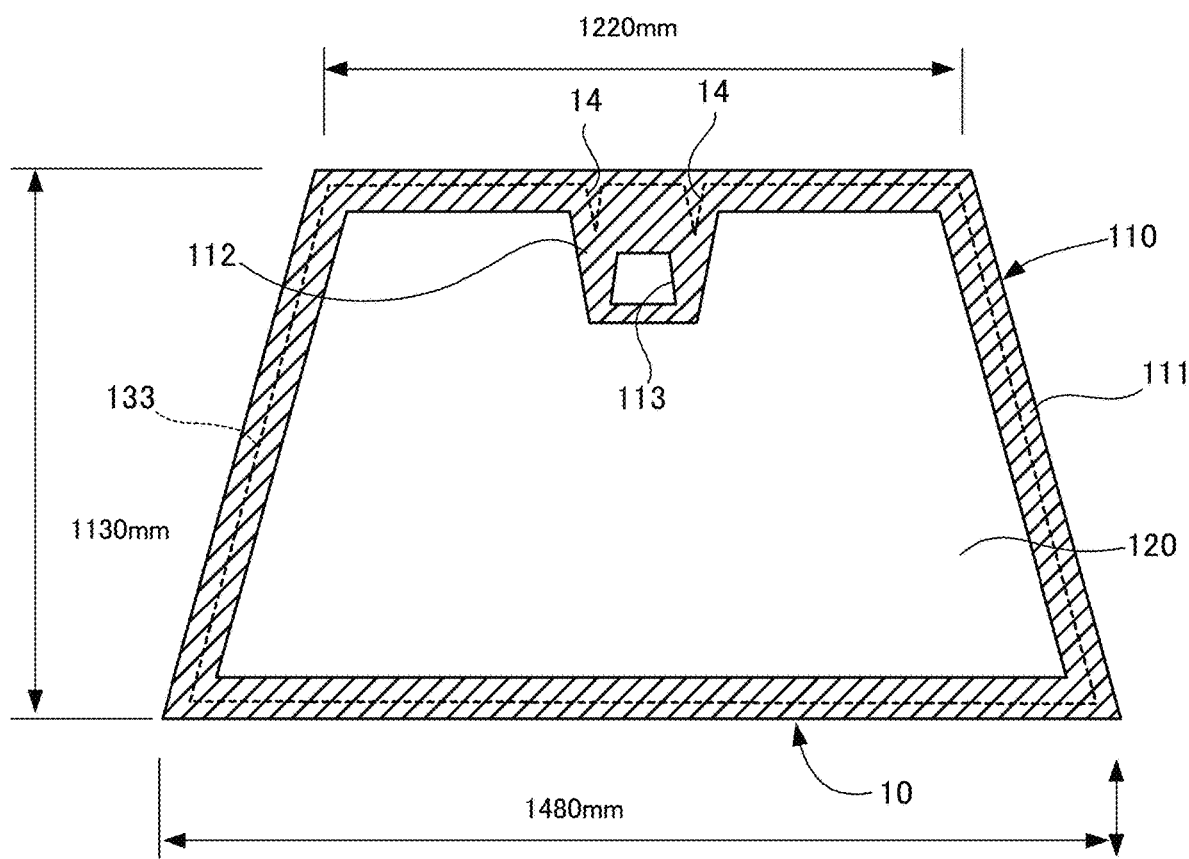
FIG. 10 is a plan view showing a windshield according to an example.
Figure 11:
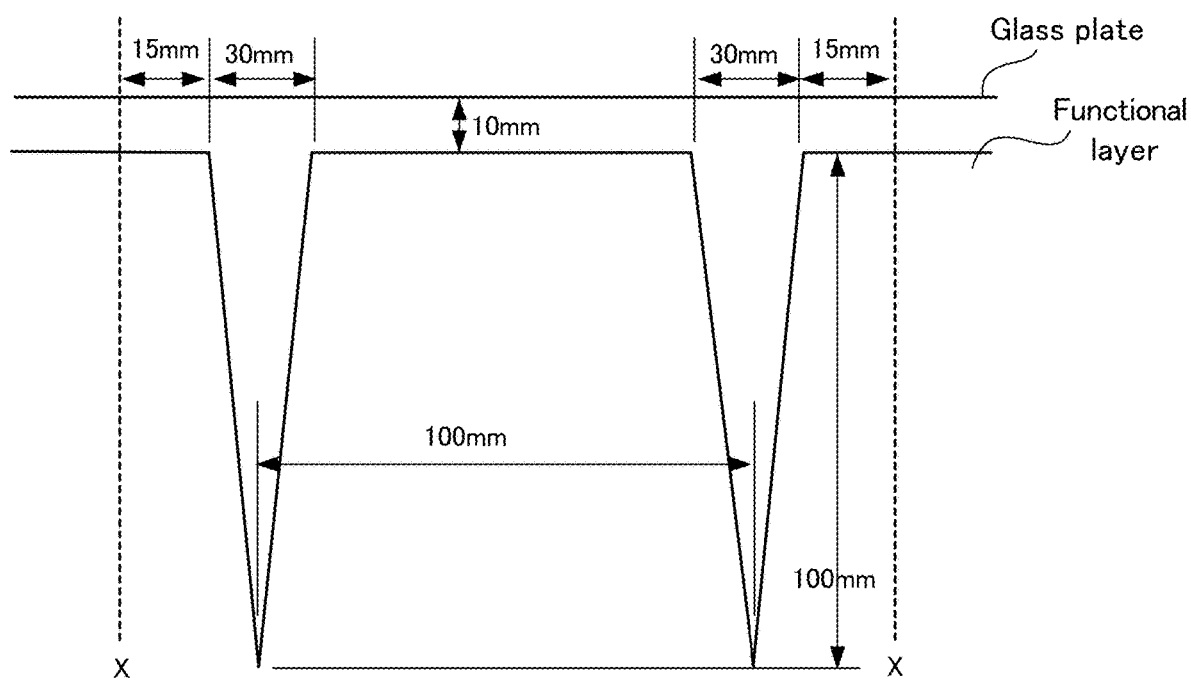
FIG. 11 is a plan view showing a notch of the example.

A windshield shown in FIG. 10 was prepared as an example using the manufacturing method described in the embodiment above. In this example, two notches 14 were formed at positions on the upper side of the functional layer 133 located above the imaging window 113. Specific dimensions of the notches 14 were as shown in FIG. 11. Moreover, the functional layer 133 was formed such that the peripheral edge of the functional layer 133 was located 10 mm inward from the peripheral edges of the glass plates 11 and 12. On the other hand, a windshield was prepared as a comparative example in the same manner as in the example above, except that no notches were formed.

Glass plates and an intermediate film as follows were used.

Outer glass plate: float glass with a thickness of 2.3 mm
Inner glass plate: float glass with a thickness of 2.0 mm
First bonding layer: PVB with a thickness of 800 μm
Functional layer with bonding layer: formed by applying PVB with a thickness of 30 μm to a projection film with a thickness of 60 μm (heat shrinkage ratio in the vertical direction: 3%, heat shrinkage ratio in the horizontal direction: 2%)

Notches were formed in the functional layer with a bonding layer.

Figure 12:
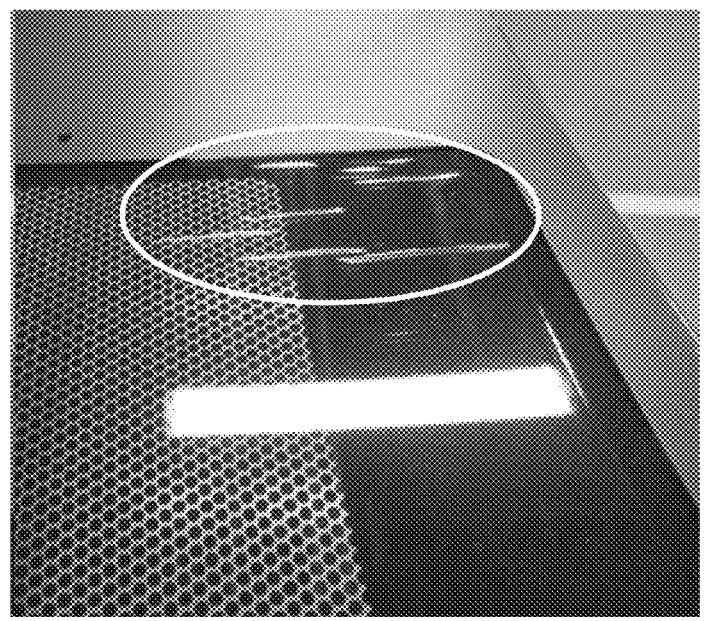
FIG. 12 is a diagram showing wrinkles formed in a windshield according to a comparative example.
Figure 13:
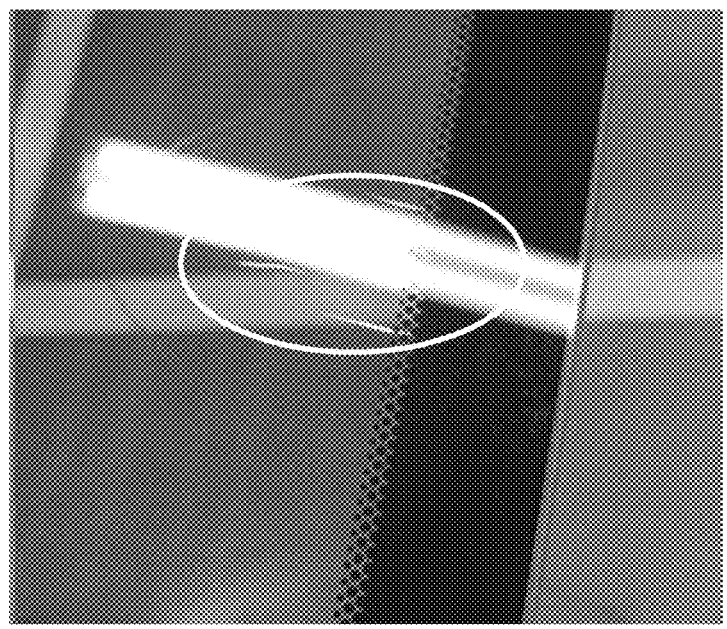
FIG. 13 is a diagram showing wrinkles formed in the windshield according to the comparative example.

As a result of observations of the windshields according to the example and the comparative example manufactured as described above, wrinkles were confirmed in the regions surrounded by a white circle in the comparative example as shown in FIGS. 12 and 13. That is to say, as shown in FIG. 12, many wrinkles formed along the upper side of the windshield were observed. Also, as shown in FIG. 13, three wrinkles formed on the right side of the windshield were observed. In addition, wrinkles extending from the peripheral edge region 111 into the protruding region 112 were confirmed (not illustrated). On the other hand, a wrinkle (about 15 mm) extending downward from the tip of the notch 14 was confirmed in the windshield according to the example (not illustrated). However, this wrinkle did not reach the imaging window 113 while being concealed by the shield layer 110 together with the notch 14, and thus could not be seen from the outside.

LIST OF REFERENCE NUMERALS

10 Laminated glass
11 Outer glass plate
12 Inner glass plate
13 Intermediate film
131 First bonding layer
132 Second bonding layer
133 Functional layer
110 Shield Layer

The invention claimed is:

1. Laminated glass to which an information acquisition device for acquiring information regarding the outside of a vehicle using light is attachable via a bracket, the laminated glass comprising:
   an outer glass plate;
   an inner glass plate disposed opposite to the outer glass plate;
   a functional layer disposed between the outer glass plate and the inner glass plate;

a bonding layer for fixing the functional layer between the two glass plates; and a shield layer that is provided on at least one of the outer glass plate and the inner glass plate and suppresses transmission of visible light from the outside of the vehicle, wherein the outer glass plate and the inner glass plate are curved in a horizontal direction and a vertical direction, the shield layer includes:

a peripheral edge region formed on a peripheral edge portion of the laminated glass to be fixed to a vehicle body; and an attachment region that protrudes from the peripheral edge region and to which at least a portion of the bracket is to be attached, and when a pair of virtual lines that extend perpendicular to an edge of the laminated glass from two sides of a connection portion where the attachment region and the peripheral edge region are coupled to each other are defined, at least one selected from at least one of notch and cut is formed at an edge of the functional layer at a position corresponding to one of a region located between the pair of virtual lines in the peripheral edge region, and the attachment region.

2. The laminated glass according to claim 1, wherein at least one notch is formed in the functional layer.

3. The laminated glass according to claim 2, wherein a tip portion of the notch is acute.

4. The laminated glass according to claim 1, wherein the outer glass plate and the inner glass plate are formed in a substantially rectangular shape with long sides and short sides, and the notch or cut is formed near at least one of the long sides.

5. The laminated glass according to claim 1, wherein a horizontal curvature radius and a vertical curvature radius of each of the outer glass plate and the inner glass plate are different, and the notch or cut is formed at an end side extending in the direction with a smaller curvature radius.

6. The laminated glass according to claim 1, wherein the attachment region is provided with an information acquisition region for accepting the light, and the notch or cut is not formed in the information acquisition region.

7. The laminated glass according to claim 1, wherein the attachment region is provided with an information acquisition region for accepting the light, and the notch is formed to include the information acquisition region.

8. The laminated glass according to claim 1, wherein at least one second notch with an acute tip is formed on the edge where the notch or cut is formed, at a position different from that of the notch or cut.

9. The laminated glass according to claim 1, wherein a plurality of the notches or cuts are formed.

10. The laminated glass according to claim 1, wherein the notch or cut is further formed at a position corresponding to the peripheral edge region of the shield layer.

11. The laminated glass according to claim 1, wherein the functional layer has a thickness of 2.0 mm or less.

12. The laminated glass according to claim 1, wherein the functional layer is formed using a projection film for an HUD.

13. The laminated glass according to claim 1, wherein the intermediate film includes the functional layer, and a pair of the bonding layers between which the functional layer is sandwiched.

* * * * *